Sept. 26, 1950             W. C. HESS             2,523,992

VALVE ACTION FOR WINDSHIELD WIPER MOTORS

Filed June 17, 1944

INVENTOR.
WILLIS C. HESS
BY
Beau, Brooks, Buckley & Beau

Patented Sept. 26, 1950

2,523,992

UNITED STATES PATENT OFFICE 2,523,992

VALVE ACTION FOR WINDSHIELD WIPER MOTORS

Willis C. Hess, Buffalo, N. Y., assignor to Trico Products Corporation, Buffalo, N. Y.

Application June 17, 1944, Serial No. 540,841

12 Claims. (Cl. 15—253)

1

This invention relates to a fluid motor and particularly to the automatic valve action thereof by which the pressure differential is reversed at the end of each motor stroke. By reason of the automatic valve action the length of the stroke of the piston, or other fluid actuated part, is determined. In some uses of the motor, such as for oscillating a windshield wiper, there is an over-riding tendency of the wiper at the end of each stroke and this is particularly accentuated and marked when the motor is operating at an accelerated speed, so much so that it becomes objectionable in that the wiper is sometimes thrown against the windshield framing structure.

The object of the present invention is to provide a fluid motor or valve action therefor by which the stroke of the motor may be adjusted to different lengths.

A further object of the invention is to provide a stroke determining valve action by which the path of the wiper may be adjusted about its axis of oscillation.

Furthermore, the invention has for its object to provide a valve action which is efficient and practical in operation and simple in construction.

Figure 1:
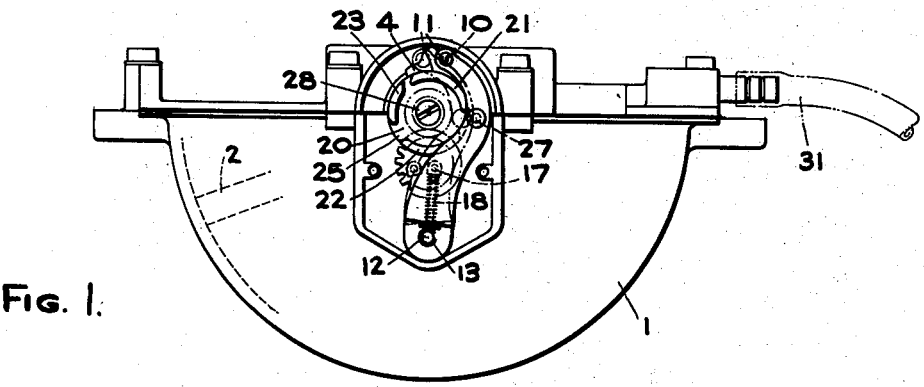
Fig. 1 is a front elevation of a motor with the cover plate of the valve chamber removed to show the improved automatic valve action.
Figure 2:
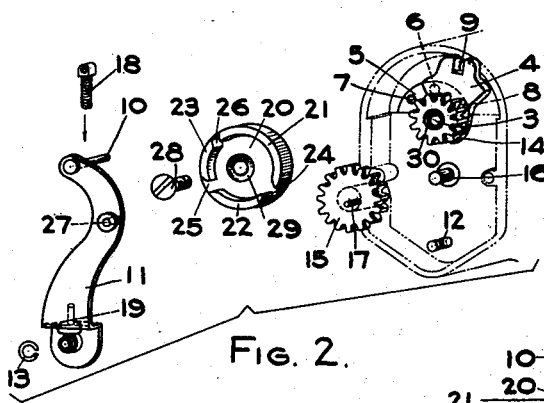
Fig. 2 is a perspective view of the valve mechanism with the component parts thereof exploded for clearer illustration.

Referring more particularly to the drawing, the numeral 1 designates the motor chamber in which oscillates or moves a vane type piston 2 which is fixed to a shaft 3 for imparting oscillatory movement to the latter. Pivotally mounted on the shaft is a valve 4 for oscillatory movement on the valve seat 5 for connecting a suction or a fluid pressure supply port 6 alternately with chamber ports 7 and 8 which, in turn, communicate with the motor chamber at opposite sides of the piston 2. The valve is formed with a recess 9 which is designed to receive a pin 10 of an actuator lever 11, the latter being pivotally mounted on a pin 12 where it is retained by a split ring 13. Fixed on the shaft 3, and overlying the valve 4 so as to hold the same in operative position, is a pinion 14 which meshes with a second pinion 15 journaled on a stub shaft 16. This second gear is formed with a crank pin

2

17 on which is hung a spring 18. The spring is shown herein as being of the coiled type and has its lower end fitting over an anchor stud 19 carried by the lever 11. As the shaft 3 is rocked by the piston 2, the spring mounting pin 17 will move downwardly through an arc to laterally deflect the spring with respect to the anchor stud 19 and thereby stress the spring laterally so as to move the lever 11 and shift the valve to one or the other of its two operative positions.

Figure 3:
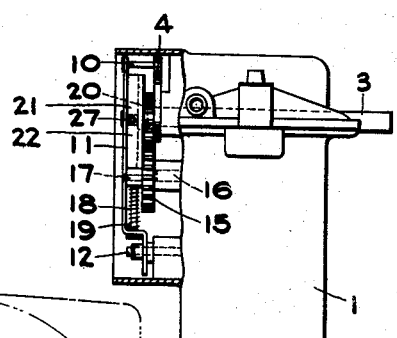
Fig. 3 is a side elevation of the valve mechanism with parts of the motor removed.

In order to hold the valve against movement until the spring 18 has been conditioned or tensioned sufficiently to insure a quick valve shifting movement of the actuator 11 there is provided an arresting device depicted herein as a disc 20 having a plurality of arcuate ribs 21, 22 and 23 of differing lengths. These ribs are spaced apart to provide release openings 24, 25 and 26. Depending from the actuator lever 11 is a lug 27 which is designed to engage alternately the inner and outer peripheral faces of the selected one of the arcuate lugs 21, 22, 23, the lug 27 being sufficiently small in size to pass radially through the release openings. The arresting device 20 is secured adjustably for movement with the shaft 3 by a screw 28 which passes through a central opening 29 and finds threaded engagement in an axial bore 30 in the end of the shaft 3. This secures the arresting device directly over the pinion 14 as shown in Figs. 1 and 3.

If a short motor stroke is desired, the shortest arcuate rib 23 is selected for co-operating with the lug 27 in timing the release of the valve shifting lever 11. Should it be desired to have a longer stroke of the motor piston, either the rib 22 of intermediate length or the rib 21 of greatest length may be selected by loosening the screw 28 and rotating the rib to its proper co-operative position. In the position of the parts shown in Fig. 1 the actuator 11 has just shifted from the dotted line position to the full line position and carried the valve 4 along therewith. This operation will have uncovered the port 7 to the atmosphere and connected the port 8 to the source of suction by way of the supply port 6 and a conduit generally shown at 31, whereupon the piston will move counterclockwise and bring the intermediate rib 22 in the path of the lug 27 to obstruct its return movement while the pinion 15 is deflecting the spring 18 to the left or dotted position shown in Fig. 1. At a predetermined interval, determined by the length of the rib 22, the valve shifting lever 11 will be released by passage of the lug 27 through the release opening 25, whereupon the piston will reverse its movement and complete its new stroke when the lug 27 is again released by the opening 24. During the interim, the lug will ride upon either the inner or the outer arcuate face of the lug to hold the lever 11 arrested as the pinion 15 continues its movement to flex the spring laterally to its desired operating tension.

Figure 4:
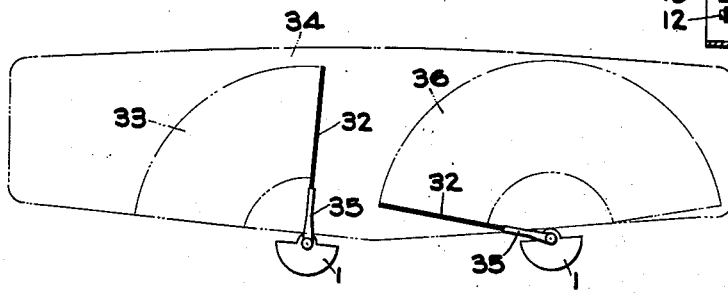
Fig. 4 is a diagrammatic view of a windshield showing two applications of the invention.

Referring to Fig. 4 which shows a practical application of the motor for operating a windshield wiper 32 through an arcuate path 33 on a windshield 34, the wiper 32 being connected to an arm 35 operatively connected to the shaft 3, the left hand portion of the windshield has the motor located off center and the wiper path is slightly less than 90° in extent such as might be defined by the shortest rib 23. To the right side of the windshield 34 the wiper path 36 is close to 160° in extent and would be defined by the longest rib 21. Referring to Fig. 4, it will be observed that the path may be shifted about the axis of oscillation, this being permitted by adjusting the timing or arresting member 20 more or less from a central position of adjustment. Consequently in addition to a selective adjustment of the wiper stroke as to arcuate extent, there is also given a selectivity of rotary adjustment or shifting of the wiper path while maintaining a given amplitude of wiper movement. This imparts to the motor a universality which will enable a most efficient installation of the same for the particular windshield on which the motor is mounted.

While the foregoing description has been given in detail, it will be understood that the mechanism described and shown herein is merely illustrative of the inventive principles involved, which may be applied to other physical embodiments without departing from the scope and spirit of the invention claimed.

What is claimed is:

1. In a fluid motor, automatic valve mechanism comprising a valve, an actuator movable back and forth for actuating the same, spring means operable to so move the actuator, a power driven timing device movable back and forth across the path of a part of the actuator for holding the latter against movement pending the conditioning of said spring means, said timing device having plural arresting parts selectively positionable to hold the actuator for different intervals of time, and means for so conditioning the spring means to move the actuator.

2. In a fluid motor, automatic valve mechanism comprising a valve, an actuator movable back and forth for actuating the same, spring means operable to so move the actuator, means for conditioning the spring means for operating the actuator, a power driven timing member having a plurality of actuator arresting ribs of different lengths selectively positionable for movement back and forth across the path of a part of the actuator for arresting the latter against movement pending the conditioning of said spring means, and means adjustably securing the timing member for selective positioning of the latter with respect to the actuator.

3. In a fluid motor, automatic valve mechanism comprising a valve, an actuator movable back and forth for actuating the same, spring means operable to so move the actuator, an oscillatory power driven shaft, a timing member oscillatable by said shaft and having a plurality of arcuate ribs circumferentially spaced apart to define release openings, said actuator having a part selectively engageable with one or the other of said ribs for riding on the inner and outer faces thereof to hold the actuator against movement pending the conditioning of said spring means and thereafter permitting said part to ride off one end or the other of the selected rib for movement of the actuator by said spring means, and means for conditioning the spring means by and during movement of the shaft.

4. In a fluid motor, automatic valve mechanism comprising a valve, an actuator movable back and forth for actuating the same, spring means operable to so move the actuator, an oscillatory power driven shaft, a timing member oscillatable by said shaft and having an arcuate rib movable back and forth across the path of a part of the actuator for holding the latter against movement pending the conditioning of said spring means and thereafter releasing the actuator for movement by said spring means, means mounting said timing member for angular adjustment about the shaft to vary the path of operation of said rib and thereby shift the path of oscillation of the arcuate rib, and means for so conditioning said spring means to move the actuator.

5. In a fluid motor, automatic valve mechanism comprising a valve, an actuator movable back and forth for actuating the same, spring means operable to so move the actuator, an oscillatory power driven shaft, a timing member oscillatable by said shaft and having a plurality of arcuate ribs circumferentially spaced apart to define release openings, said actuator having a part selectively engageable with one or the other of said ribs for riding on the inner and outer faces thereof to hold the actuator against movement pending the conditioning of said spring means and thereafter permitting said part to ride off one end or the other of the selected rib for movement of the actuator by said spring means, means for adjusting said timing member thereby to enable a circumferential shifting of the path of operation of said ribs, and means for conditioning the spring means by and during movement of the shaft.

6. Automatic valve mechanism comprising a power driven shaft, a valve mounted for oscillation on the shaft, a lever pivotally mounted at one end and having its opposite end connected to the valve for actuating the same back and forth, a spring connected at one end to the lever, means for flexing the spring laterally to condition the same to so move the lever, and means for holding the lever against movement pending the conditioning of said spring and thereafter releasing the same for operation by the spring.

7. Automatic valve mechanism comprising a power driven shaft, a valve mounted for oscillation on the shaft, a lever pivotally mounted at one end and having its opposite end connected to the valve for actuating the same back and forth, a spring connected at one end to the lever, means for flexing the spring laterally to condition the same to so move the lever, and means for holding the lever against movement pending the conditioning of said spring and thereafter releasing the same for operation by the spring, said conditioning means being in the form of a member oscillatable by the shaft and to which the spring is connected eccentrically.

8. Automatic valve mechanism comprising a power driven shaft, a valve mounted for oscillation on the shaft, a lever pivotally mounted at one end and having its opposite end connected to the valve for actuating the same back and forth, a spring connected at one end to the lever, means for flexing the spring laterally to condition the same to so move the lever, and means for holding the lever against movement pending the conditioning of said spring and thereafter releasing the same for operation by the spring, said conditioning means including a gear fixed on the shaft and meshing with a second gear for oscillating the same, the opposite end of the spring being connected to the second gear eccentrically for so flexing the same laterally.

9. Automatic valve mechanism comprising a power driven shaft, a valve mounted for oscillation on the shaft, a lever pivotally mounted at one end and having its opposite end connected to the valve for actuating the same back and forth, a spring connected at one end to the lever, means for flexing the spring laterally to condition the same to so move the lever, and means for holding the lever against movement pending the condition of said spring and thereafter releasing the same for operation by the spring, said arresting means being in the form of a disc fixed to the shaft for oscillation thereby and having an arcuate rib movable back and forth across the path of a part of the lever for holding the latter against movement pending the conditioning of said spring.

10. In a fluid motor, automatic valve mechanism comprising a valve, an actuator for moving the valve back and forth between two operative positions on its seat, spring means operable to so move the actuator, means responsive to a pressure operable part of the motor for conditioning the spring means for so operating the actuator, and a power driven timing means having a plurality of actuator arresting parts of different lengths selectively positionable for movement back and forth across the path of the actuator for holding the latter arrested for different time intervals pending the conditioning of said spring means and thereafter releasing the actuator for movement by such spring means.

11. A windshield cleaner comprising a fluid motor having an actuating shaft, a wiper operatively connected to the shaft for being oscillated thereby, and automatic valve mechanism for reversing the fluid pressure applications to the pressure responsive part of the motor for determining the amplitude of movement of the wiper in a given path, said valve mechanism embodying a valve, an actuator for moving the valve back and forth between two operative positions, spring means responsive to a pressure operable part of the motor for so moving the actuator, and a power driven timing member having an actuator arresting part selectively positionable to shift the path of the wiper while maintaining the given amplitude of wiper movement.

12. A windshield cleaner comprising a fluid motor having an oscillatory shaft, a wiper operatively connected to the shaft for being oscillated thereby, means operable by the motor for reversing the fluid pressure applications to the pressure responsive part of the motor for so oscillating the shaft and its connected wiper throughout a fixed amplitude of movement, and means operable to angularly adjust the path of the wiper while maintaining the given amplitude of movement.

WILLIS C. HESS.

REFERENCES CITED

The following references are of record in the file of this patent:

UNITED STATES PATENTS

| Number | Name | Date |
|---|---|---|
| 1,009,066 | Heger | Nov. 21, 1911 |
| 2,103,001 | Evans et al. | Dec. 21, 1937 |
| 2,310,750 | Schnell | Feb. 9, 1943 |
| 2,316,316 | Coffey | Apr. 13, 1943 |
| 2,363,621 | Rappl | Nov. 28, 1944 |